W. N. SPRINGER.
GANG PLOW.
APPLICATION FILED SEPT. 17, 1913.
1,103,700.
Patented July 14, 1914.
3 SHEETS—SHEET 1.
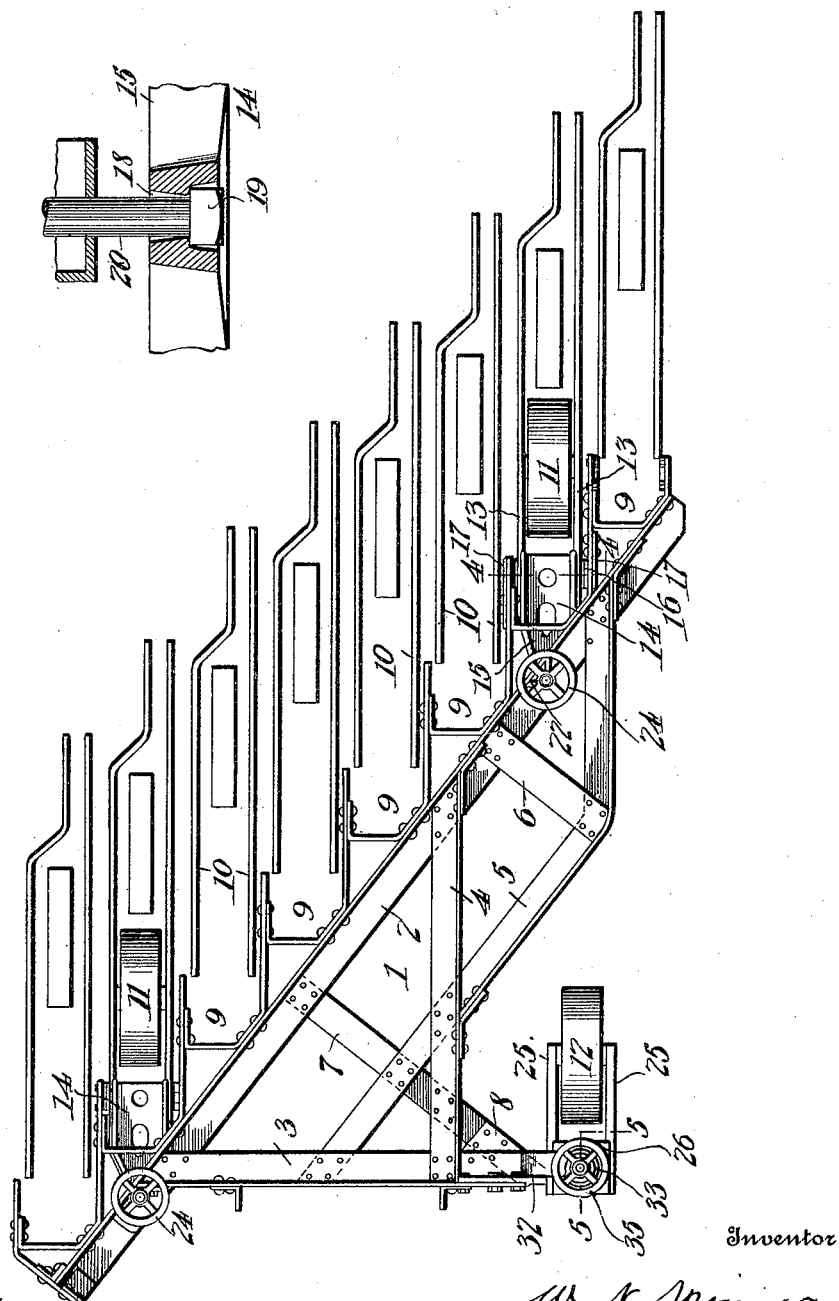

W. N. SPRINGER.
GANG PLOW.
APPLICATION FILED SEPT. 17, 1913.
1,103,700.
Patented July 14, 1914.
3 SHEETS—SHEET 2.
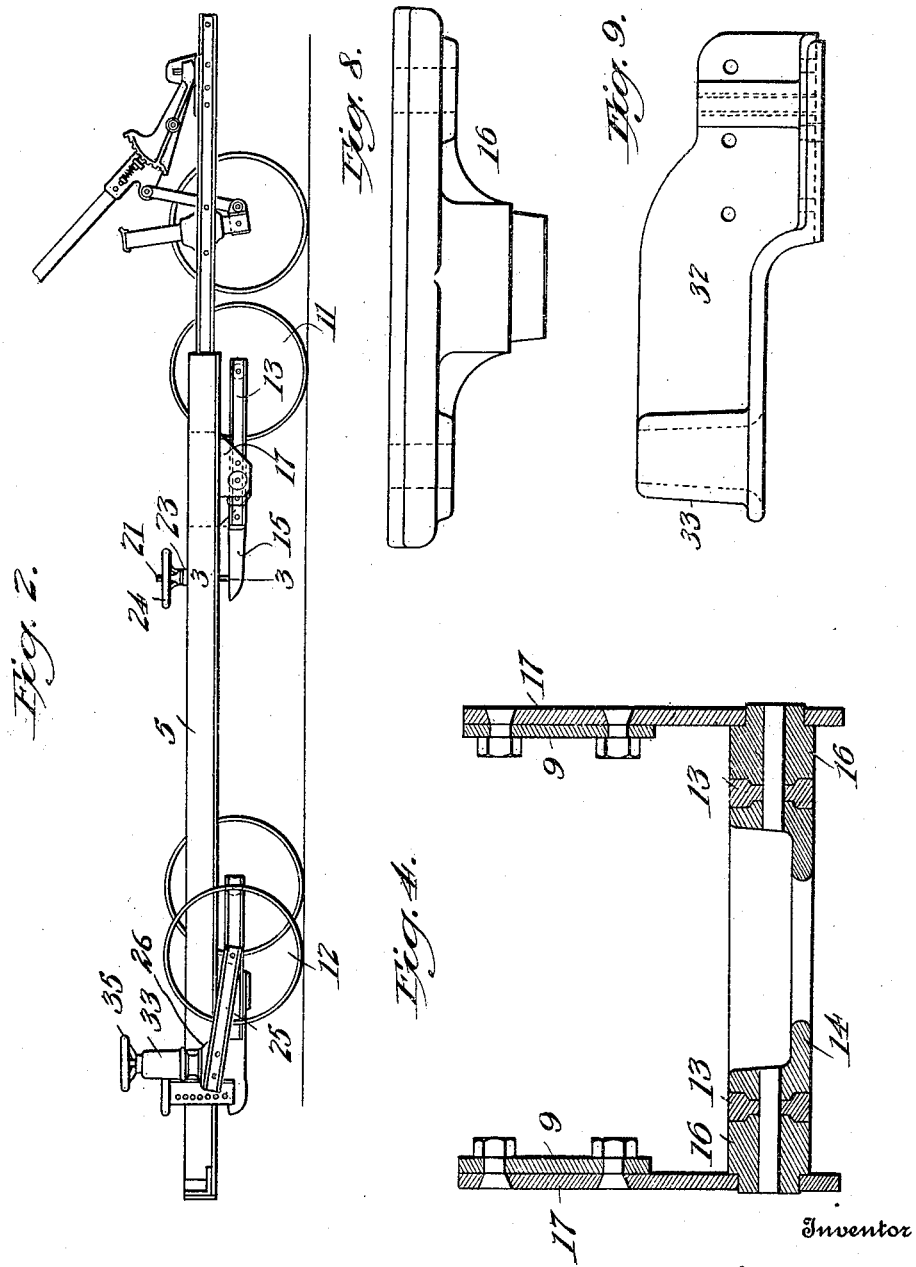
Witnesses
Inventor
W. N. Springer
By H. A. Seymour
Attorney W. N. SPRINGER.
GANG PLOW.
APPLICATION FILED SEPT. 17, 1913.
1,103,700.
Patented July 14, 1914.
3 SHEETS—SHEET 3.
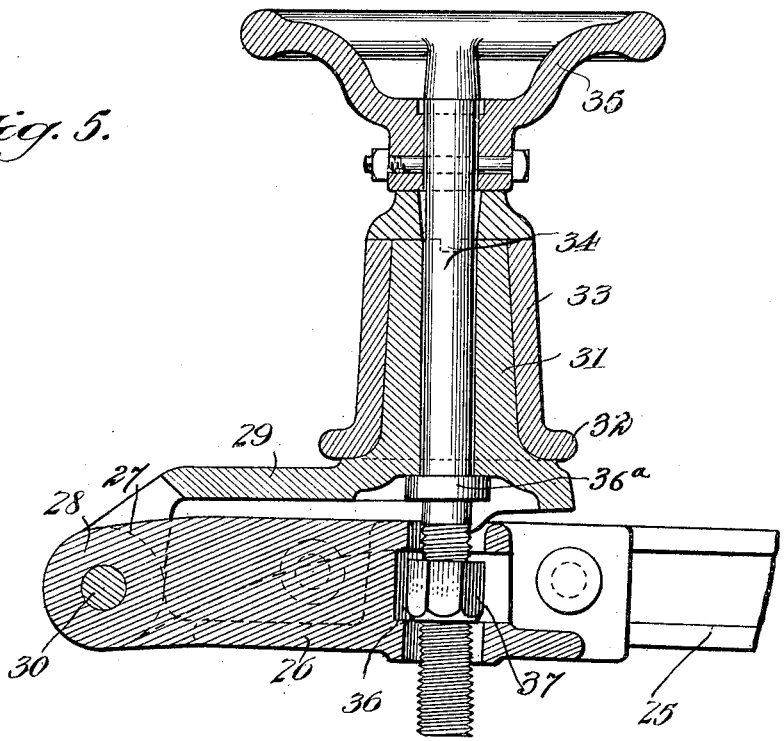
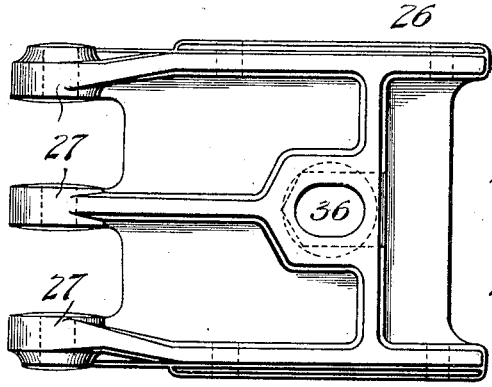
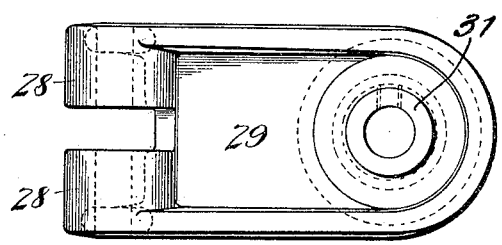

UNITED STATES PATENT OFFICE.

WILLIAM N. SPRINGER, OF SOUTH BEND, INDIANA, ASSIGNOR TO OLIVER CHILLED PLOW WORKS, OF SOUTH BEND, INDIANA.

GANG-PLOW.

1,103,700.  Specification of Letters Patent.  Patented July 14, 1914.

Application filed September 17, 1913. Serial No. 790,343.

*To all whom it may concern:*

Be it known that I, WILLIAM N. SPRINGER, of South Bend, in the county of St. Joseph and State of Indiana, have invented certain new and useful Improvements in Gang-Plows; and I do hereby declare the following to be a full, clear, and exact description of the invention, such as will enable others skilled in the art to which it appertains to make and use the same.

This invention relates to improvements in engine gang plows and more particularly to the truck frame,—one object of my present invention being to provide simple and efficient means for adjusting the wheels of said truck frame to level the latter.

With this and other objects in view, the invention consists in certain novel features of construction and combinations of parts as hereinafter set forth and pointed out in the claims.

In the accompanying drawings, Figure 1 is a plan view of a truck frame embodying my improvements; Fig. 2 is a side elevation; Fig. 3 is an enlarged sectional view on the line 3—3 of Fig. 2; Fig. 4 is an enlarged sectional view on the line 4—4 of Fig. 1; Fig. 5 is an enlarged sectional view on the line 5—5 of Fig. 1, and Figs. 6, 7, 8 and 9 are enlarged detail views.

1 represents a truck frame, comprising a rear diagonal angle beam 2; a front or draft angle beam 3, disposed at right angles to the line of draft and secured at one end to the beam 2, and an angle beam 4 disposed parallel with the line of draft and secured at its respective ends to the rear diagonal beam 2 and the front draft beam 3. The truck frame also comprises in its structure, a brace beam 5, disposed throughout the greater portion of its length parallel with the diagonal beam. One end of the brace beam 5 is secured to the front or draft beam 3 and is bent at a point a comparatively short distance from its other end and secured to the rear beam 2. The brace beam 5 passes under the beam 4 and is rigidly secured to the latter and a brace 6 is secured at one end to the beam 5 where the latter is bent, and the other end of this brace is secured to the rear beam 2. The front or draft beam 3 projects laterally beyond its connection with the beam 4, and to this projecting end of the latter, one end of an angle beam brace 7 is secured, preferably through the medium of a tie plate 8. The brace 7 is disposed at right angles to the rear beam 2 and is secured at one end thereto, the intermediate portions of said brace beam 7 being secured to the beams 4 and 5.

A plurality of brackets 9 project from the diagonal rear beam 2 for the reception of connecting means (not shown) for a plurality of plow beams shown diagrammatically at 10.

The truck frame is supported on rear wheels 11—11 located near and behind respective ends of the frame, and a caster wheel 12 located at the free end of the front beam 3. The mountings and means for adjusting the trailing wheels 11—11 are the same for both of said wheels, and a detail description of one set of these devices will suffice for both.

The axle of each trailing wheel 11 is disposed between the rear end portions of two bars 13—13, the forward ends of which are secured to the respective sides of and separated by a spacer 14 having a forwardly projecting arm 15. Pivot blocks 16 are secured to the respective bars 13 at opposite sides of the spacer 14 and these blocks are pivotally supported near the lower ends of plates 17 secured to and depending from the side members of one of the brackets 9. The bars 13 and spacer 14 constitute a lever pivotally supported below the truck frame by the plates 17 secured to the truck bracket, the trailing wheel 11 being connected with one end of such lever, and arm 15 of the spacer (which constitutes a portion of the forward arm of the lever) being of sufficient length to project under the rear diagonal bar of the truck frame. The forward end portion of the arm 15 is made with an opening 18, the lower portion of which is enlarged to form a seat for a head 19 at the lower end of a rod 20 having a threaded upper portion 21. The rod 20 passes upwardly through the horizontal flange of the angle beam 2 and is mounted in a bearing bracket 22 secured to the vertical flange of said angle beam. The bracket 22 is made with an upward projection or hub 23, upon which the hub of a hand wheel 24 on the threaded upper end of the rod has a bearing. It is apparent that by operating the hand wheel, the rod 20 will be raised or lowered (according to the direction in which the hand wheel may be turned) and the lever formed by the parts 11—13—14—15, will be turned on its bearings afforded by the depending plates 17, and thus the rear portion of the truck frame may be raised or lowered at one or both ends for leveling the same.

The caster wheel 12 is mounted at the rear ends of two bars 25—25, the forward ends of said bars being secured to respective sides of a spacer 26. This spacer is provided at its forward end with three perforated bosses 27 to receive between them, perforated arms 28 projecting forwardly and downwardly from a bracket 29, a bolt 30 passing through said perforated bosses and arms to pivotally connect said bracket 29 with the spacer 26. The bracket 29 is provided with a pivot post 31 which has a pivotal bearing in one end of a bracket 32 secured to the free end of the front or draft beam 3 of the truck frame.

A post 33 is located upon the bracket 32 and through this post a rod 34 passes,—the upper end of said rod having a hand wheel 35 secured thereto. The rod 35 also passes through the tubular pivot post 31, and its lower portion is threaded and enters an elongated opening 36 in the spreader 26. A nut 37 is mounted in the opening 36 of the spreader 26 for the reception of the threaded portion of the rod 34, and said nut is prevented from turning by engagement with the parallel walls of said opening 36. A collar 36ª on the rod 34 engages the bottom of the bracket 31.

From the construction and arrangement as above described, it will be seen that the caster wheel 12 may swing horizontally by reason of the pivotal connection of the bracket 29 with the bracket 32 and that by turning the rod 34, motion will be imparted, through the medium of the nut 37, to the pivoted spreader 26 for raising or lowering the same and said caster wheel. The spreader 26, bars 25 and caster wheel, thus constitute a lever, the operation of which will effect the raising or lowering of the forward portion of the truck frame for leveling the same.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a gang plow structure, the combination with a truck frame, and brackets thereon, of pairs of bars, a wheel mounted between the rear ends of the bars of each pair, a spacer between the forward ends of the bars of each pair and projecting forwardly therefrom, means pivotally connecting said bars and spacers with said brackets, a vertical rod connected with each spacer, bearings for said rods, and a hand wheel on each of said rods.

2. In a gang plow structure, the combination with a truck frame, and a bracket thereon, of a spacer pivoted at one end to said bracket, said spacer provided with an opening having flat walls, bars secured to said spacer, a wheel mounted between said bars, a vertical rod mounted on the truck frame and having a threaded portion passing through said spacer, a nut on said rod in the opening in the spacer, and a hand-operated device on said rod for turning the latter.

3. In a gang plow structure, the combination with a truck frame, of a fixed bracket secured to the truck frame, a bracket mounted on the fixed bracket to swing horizontally, wheel bars, a spreader between said wheel bars and pivotally connected with said swinging bracket, a wheel mounted between the rear ends of said wheel bars, a nut carried by said spreader, a rod passing through the brackets on the truck frame and having a threaded portion passing through said nut, and means for turning said rod.

In testimony whereof, I have signed this specification in the presence of two subscribing witnesses.

WILLIAM N. SPRINGER.

Witnesses:
EDWIN C. NICAR,
KATE E. BUCKLEY.

Copies of this patent may be obtained for five cents each, by addressing the "Commissioner of Patents, Washington, D. C."